(12) United States Patent
Roulston (10) Patent No.: US 8,479,466 B2
(45) Date of Patent: Jul. 9, 2013

(54) BLOCKOUTS FOR CONCRETE MOLDS

(75) Inventor: Matthew Liam Roulston, Townsville (AU)

(73) Assignee: Light-Weight Concrete Townsville Pty Ltd., Townsville, Queensland (AU)

( * ) Notice: Subject to any disclaimer, the term of this patent is extended or adjusted under 35 U.S.C. 154(b) by 46 days.

(21) Appl. No.: 13/227,317

(22) Filed: Sep. 7, 2011

(65) Prior Publication Data

US 2012/0055114 A1 Mar. 8, 2012

(30) Foreign Application Priority Data

Sep. 7, 2010 (AU) .................................. 2010904026

(51) Int. Cl.
*E02D 27/32* (2006.01)
(52) U.S. Cl.
USPC .................................. 52/295; 52/700; 249/190
(58) Field of Classification Search
USPC .................... 249/190, 207, 213, 183; 52/294, 52/295, 699, 700, 100
See application file for complete search history.

(56) References Cited

U.S. PATENT DOCUMENTS

| 3,844,527 | A | | 10/1974 | Scott |
| 3,867,804 | A | | 2/1975 | Wilson |
| 4,117,643 | A | * | 10/1978 | Lamothe ......................... 52/699 |
| 4,412,407 | A | * | 11/1983 | Melfi et al. ..................... 52/699 |
| 5,098,059 | A | | 3/1992 | Sawyer |
| 5,388,804 | A | | 2/1995 | Cohen et al. |
| 6,601,354 | B2 | | 8/2003 | Hughes |
| 7,076,924 | B2 | | 7/2006 | Thompson |
| 2007/0194205 | A1 | | 8/2007 | Blackmon |

OTHER PUBLICATIONS

International-Type Search Report, dated May 24, 2011, from the Australian Patent Office for corresponding Australian Patent Application No. AU2010904026, 4 pages.

* cited by examiner

*Primary Examiner* — Jeanette E Chapman
*Assistant Examiner* — Daniel Kenny
(74) *Attorney, Agent, or Firm* — Klarquist Sparkman, LLP (57) ABSTRACT

A blockout mold is mountable on an anchor bolt to enable a recess to be formed around the anchor bolt when concrete is poured, and is easily stripped from the recess after the concrete has set. The blockout mold has a body and a neck portion with an elongate bore therethrough to receive the shank of the anchor bolt. Pairs of vertically spaced slots in the neck portion enable a releasable clip to selectively secure the neck portion to the shank; while the body has a sleeve of compressible material to enable the blockout mold to be stripped from the recess.

11 Claims, 10 Drawing Sheets

BLOCKOUTS FOR CONCRETE MOLDS

CROSS REFERENCE TO RELATED APPLICATION

The present application claims the benefit of and priority to Australia Patent No. 2010904026, filed Sep. 7, 2010, which is incorporated herein by reference.

FIELD

This invention relates to blockouts for concrete molds.

The invention is particularly suitable for, but not limited to, blockouts for forming recesses, such as annular spaces, around anchoring- or reinforcing-bars, rods, studs or the like, which will be hereinafter referred to in the specification as "anchor bolts."

BACKGROUND

Anchor bolts, which may be welded, or otherwise fastened, to the reinforcing-bars and/or cages, are typically anchored in concrete-footings or mounting-blocks, pads or slabs, (hereinafter referred to as "a concrete slab"), to enable the mounting of infrastructure, such as portal frames, light-posts, street-signs; or machinery, such as engines, motors, supports for conveyors; or the like.

Typically, the anchor bars are arranged in one or more pairs in a pre-arranged pattern, in the concrete slab, to align with the holes/recesses in the base plate(s) of the infrastructure/machinery to be mounted thereon.

It is not always possible to ensure that the anchor bolts will be accurately located before the concrete is poured; or will not be bent, or otherwise dislocated, before the installation of the infrastructure/machinery.

It is typical, therefore, to provide a recess, such as an annular space, around at least an upper portion of each anchor bolt that would otherwise be embedded in the concrete slab. This enables one or more of the anchor bolts in a pattern to be "deflected" into alignment with respective holes/recesses in the base of the infrastructure/machinery.

After the anchor bolt(s) have been so aligned, the recesses are usually filled with grout, or other cementitious material, to the level of the underside of the infrastructure/machinery and the surrounding top surfaces of the concrete slab.

Typically the prior art blockouts employed to form the recesses are manufactured "on-site", being cut from lengths of expanded-polystyrene tubes, which have an internal bore substantially equal to the outer diameter of the anchor bolts. The blockouts are cut to length; and are typically shaped to the desired external shape using knives, or other shaping tools; and are then typically wrapped in "duct tape", to limit the ingress of water from the surrounding cementitious mix, as the concrete is poured and at least partially-set.

When the concrete has at least partially set, each blockout must be dug out of, or destroyed in and removed from, its respective recess, e.g., by using scrapers or like hand-tools to expose the recess.

Not only is this time consuming e.g., typically taking 10 to 15 minutes for the production and removal of each blockout; but the method is particularly messy, with polystyrene pieces/shavings being spread around the worksite, both when the individual blockouts are cut and shaped from the parent tubes; and then when the blockouts are dug out from their recesses. The polystyrene pieces/shavings may affect the workers' breathing, and can be slippery under foot, providing a workplace occupational health and safety (OH&S) hazard; and also an environmental hazard to adjacent waterways and the like.

A "vacuum cleaner", or like suction apparatus with a collection bag, should preferably be employed to clean the worksite of the polystyrene pieces/shavings.

Finally, each blockout is manufactured for use on a once-only basis; and is therefore wasteful of the polystyrene materials and the transport required from the factory (or warehouse) to the site.

SUMMARY

It is an object of certain embodiments of the present disclosure to provide a blockout, for forming recesses in concrete molds, which may be reusable.

It is a preferred object of certain embodiments of the present disclosure to provide a blockout which can be easily, and selectively, mounted on an anchor bolt before the concrete is poured.

It is a further preferred object of certain embodiments of the present disclosure to provide such a blockout which can easily be stripped from the recess formed around the anchor bolt after the surrounding concrete has at least partially set.

It is a still further preferred object of certain embodiments of the present disclosure to provide a blockout which can be easily, adjustably-positioned on the anchor bolt.

Other preferred objects of the present disclosure will become apparent from the following description.

In one aspect, embodiments of the present disclosure reside in a blockout to form a recess in a concrete slab (as hereinbefore defined) surrounding an anchor bolt (as hereinbefore defined), or the like, including:

a body portion having an external profile conforming to the profile of the recess to be formed;

an (optional) neck-portion extending upwardly from the body portion, when in use;

an elongate bore through the body portion and the neck portion, the elongate bore having a diameter (optionally) substantially equal to, or less than, an outer diameter of the anchor bolt; and a releasable locating means engageable with the body portion and/or the neck portion and with the anchor bolt, when in use, to releasably locate the body portion on the anchor bolt while the recess is being formed.

Preferably, the body portion has a resiliently-deformable outer surface or "skin"; or if it has a substantially-rigid outer surface, provided with a removable sleeve, formed of resiliently-deformable material, surrounding the body portion (and preferably extending upwardly there-from); to assist in the removal of the body portion when the recess has been formed.

Preferably, the body portion and neck portion are of unitary construction; but may be formed separately and then interconnected before use e.g., by gluing, R.F. welding, or via a lockable coupling.

Preferably, the body and neck portions are molded, or otherwise-formed, from suitable plastics-material, such as PVC, polyethylene (e.g., HDPE), polypropylene or ABS; and may incorporate glass- or carbon-reinforcing fibers.

Preferably, the resiliently-deformable outer surface or "skin", or the removable sleeve; is formed of fabric-coated neoprene e.g., of the type used for "wetsuits" or "stubbie-holders".

While the body portion may be of solid construction, it may alternatively be of hollow construction (e.g., by blow-molding), with optional internal reinforcing ribs and/or rings.

While the body portion is preferably circular in top plan view, it may have other shapes e.g., square, rectangular, hexagonal, octagonal, or the like, in top plan view, dependent on the desired shape of the recess to be formed thereby.

Preferably, the neck portion is provided with one or more pairs of vertically-spaced aligned slots, open to the elongate bore, arranged to receive the releasable locating means and to allow engagement of the releasable locating means with adjacent portion(s) of the anchor bolt.

Preferably, at least a portion of the anchor bolt, receivable within the neck portion, has a screw-threaded or non-circular external profile, to be engageable by at least one portion of the releasable locating means. Alternative non-circular profiles for the anchor bolt include ribs, flanges, recesses, grooves or the like on the portion of the anchor bolt.

Preferably, the releasable locating means is a clip or retainer having at least one arm or finger releasably engageable with the screw-threaded or non-circular profile on the anchor bolt.

In a second aspect, embodiments of the present disclosure reside in a method of forming a recess about an anchor bolt, employing the blockout hereinbefore described, including the steps of:

a) placing the body portion on the anchor bolt, with optional frictional engagement between the anchor bolt and the elongate bore;

b) engaging the releasable locating means with the body portion or neck portion to locate the body portion relative to the anchor bolt;

c) filling the mold cavity, surrounding the anchor bolt, and the blockout, with a cementitious (or like) mixture to the desired level;

d) allowing the cementitious mixture to at least partially-set;

e) releasing the releasable locating means; and f) withdrawing the body portion from the anchor bolt to leave a recess in the at least partially-set cementitious mixture surrounding the anchor bolt.

Preferably, when the body portion is provided with the removable sleeve, the method includes the further step of:

g) stripping the removable sleeve from the adjacent sidewall of the recess.

Preferably, after the removable sleeve has been removed from the recess, the method includes the further step of:

h) filling the recess with grout, or other cementitious material, to the intended level of the infrastructure/machinery to be secured to the slab and/or surrounding top surface(s) of the concrete slab.

The foregoing and other objects, features, and advantages of the invention will become more apparent from the following detailed description, which proceeds with reference to the accompanying figures.

BRIEF DESCRIPTION OF THE DRAWINGS

To enable the invention to be fully understood, preferred embodiments will now be described with reference to the accompanying drawings, in which.

DETAILED DESCRIPTION

Figure 1:
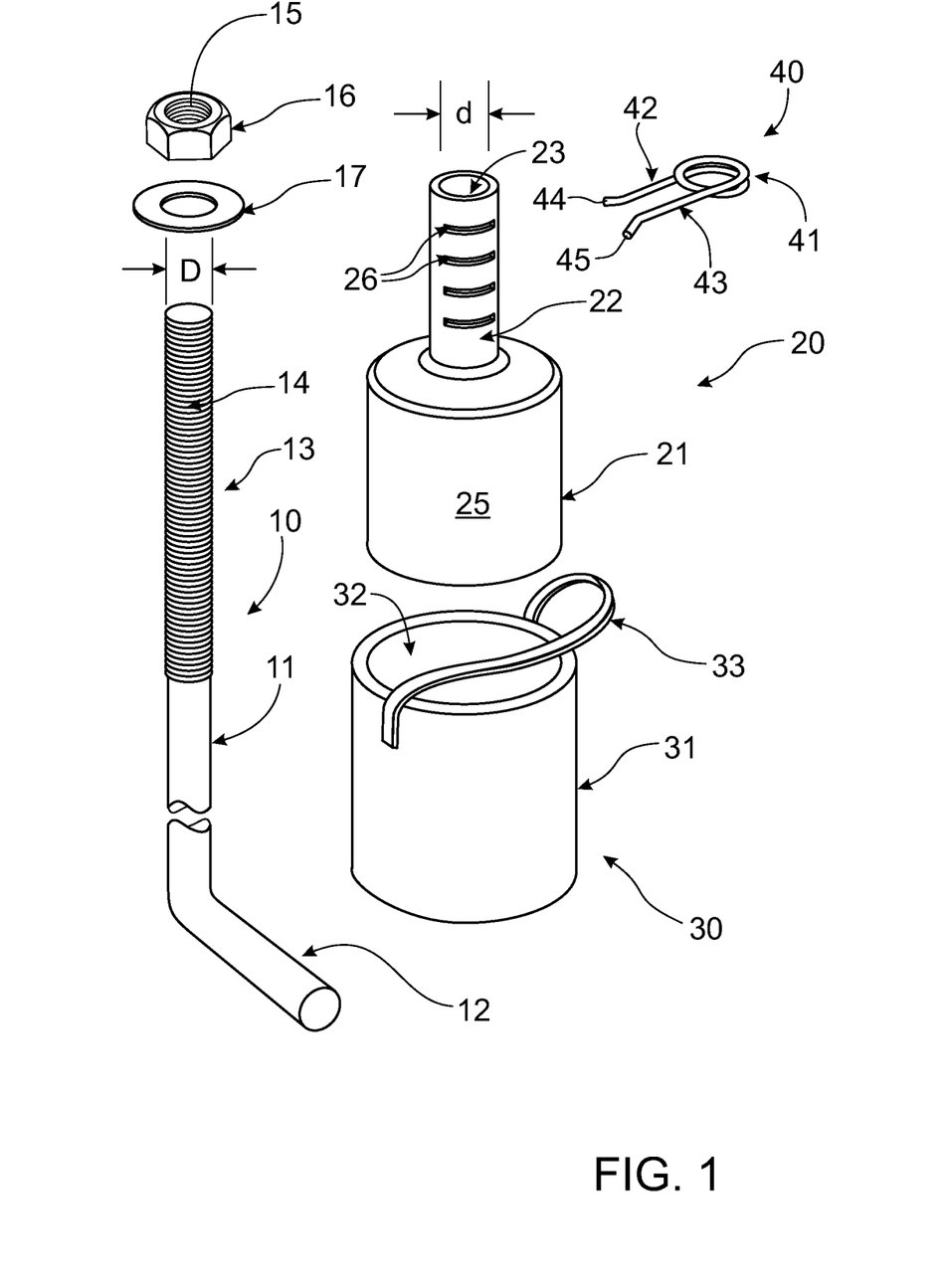
FIG. 1 is a perspective "exploded" view of an embodiment of the blockout, in accordance with the present invention, and an associated anchor bolt.
Figure 2:
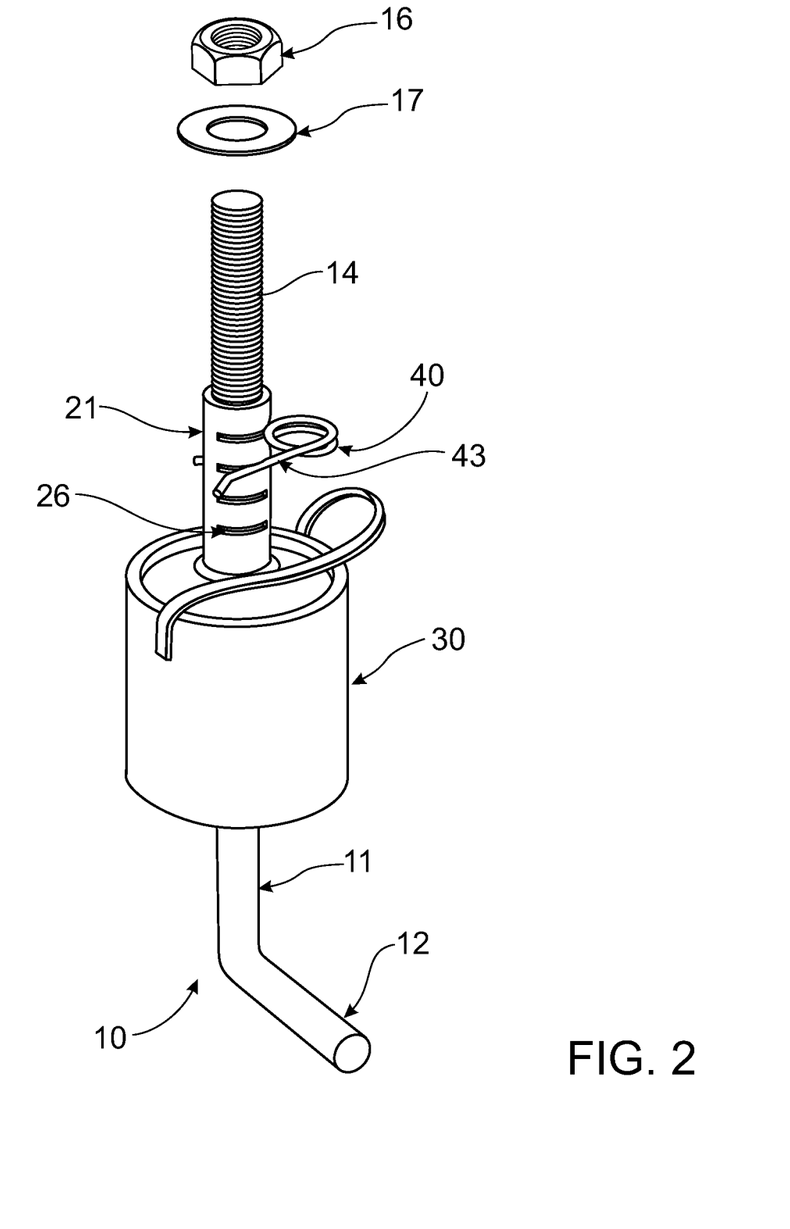
FIG. 2 is a perspective "assembled" view of the blockout fitted to the anchor bolt.
Figure 3:
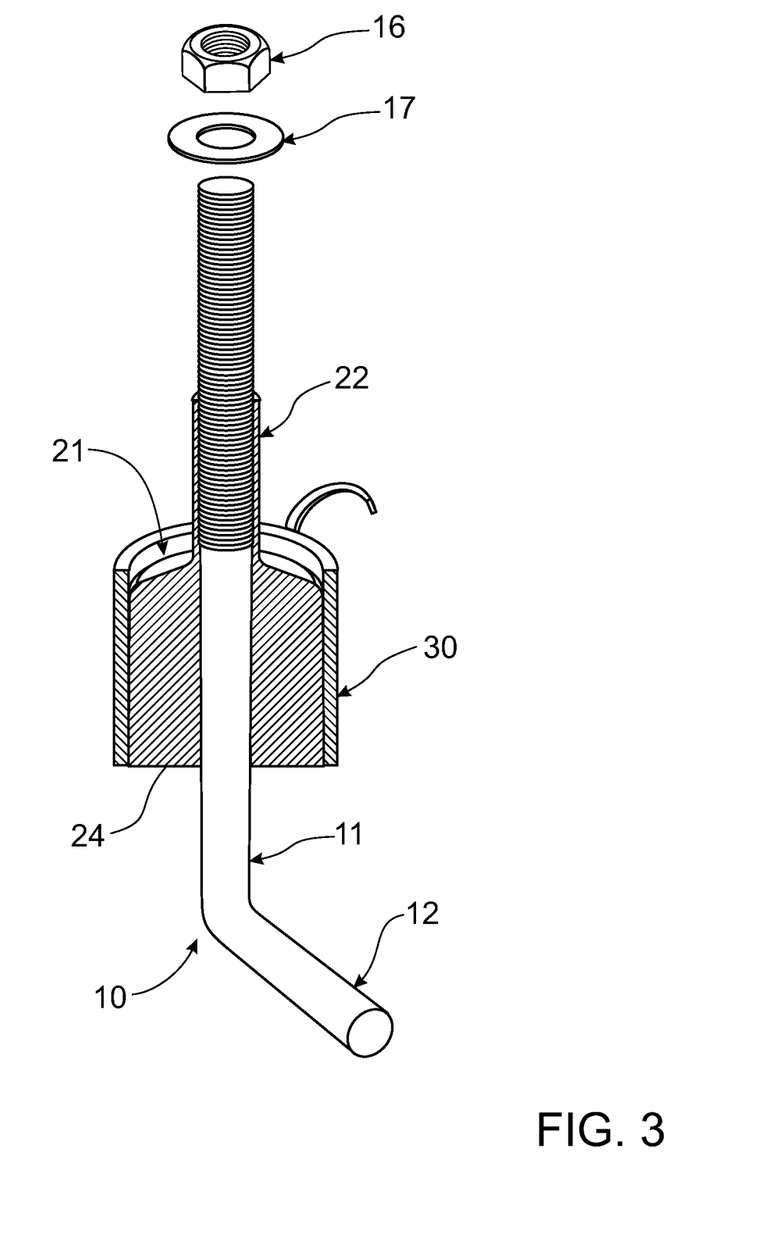
FIG. 3 is a perspective sectional side view corresponding to FIG. 2.
Figure 4:
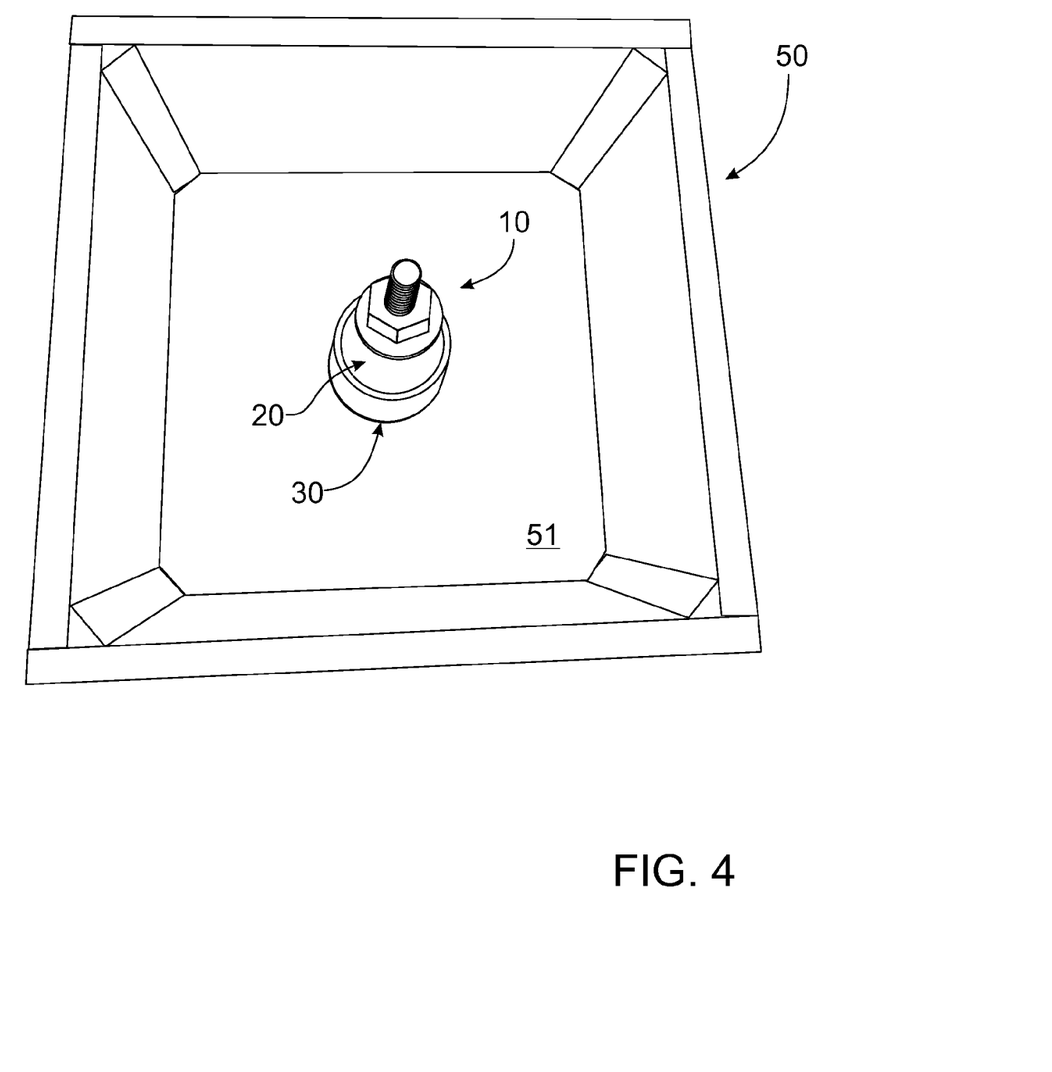
FIG. 4 is a top perspective view of the blockout fitted to the anchor bolt within a mold box.

Referring to FIGS. 1 to 3, the anchor bolt 10 has an elongate cylindrical shank 11 surmounting a laterally extending foot 12. The foot 12 may welded, or otherwise fixed, to the reinforcing bars/rods/cage(s) (not shown) of the concrete slab S to be hereinafter described; or may provide the steel reinforcing for the concrete slab S.

The upper portion 13 of the elongate shank 11 has a screw-threaded profile 14 complementary to the screw-threaded bore 15 of a nut 16, which can co-operate with a washer 17 (and a locknut—not shown) to anchor a base plate (not shown) of infrastructure/machinery to the concrete slab S.

The blockout 20 has a cylindrical body portion 21 surmounted by a co-axial neck portion 22. Preferably, the body portion 21 and the neck portion 22 are molded integrally from suitable plastics material, e.g., PVC/polyethylene/polypropylene/ABS; and an elongate plain bore 23 extends coaxially through the body portion 21 and the neck portion 22. The diameter d of the elongate bore 23 is preferably just smaller (e.g., by 1-2 mm) than the outer diameter D of the elongate shank 11 of the anchor bolt 10.

In the embodiment illustrated in FIGS. 1 to 3, the body portion 21 is of cylindrical configuration, i.e., circular in top plan view to enable an annular recess 60, having a side wall 61 and bottom wall 62, to be molded coaxially with the anchor bolt 10 in the concrete slab S, as will be hereinafter described.

While the body portion 21 may be formed as a solid component, it may also be formed as a hollow component (e.g., by blow-molding) with one or more internal reinforcing ribs and/or rings.

The skilled artisan will also appreciate that the body portion 21 and the neck portion 22 may be manufactured separately and then assembled together before use e.g., via gluing, R.F. welding or by complementary lockable coupling components.

The annular bottom face 24 of the body portion 21 operates to define the bottom wall 62 of the recess 60; while the removable sleeve 30, to be hereinafter described, operates to define the side wall 61 of the recess 60.

The height H of the body portion 21 is preferably greater than the depth h of the recess 60, to ensure that the upper portion of the side wall 61 is not inwardly convergent in side elevation.

The removable sleeve 30 has an annular body 31, with an internal bore 32 of a diameter ID slightly smaller (e.g., by 2-5 mm) than outer diameter OD of the side wall 25 of the body portion 21, to which it is fitted by stretching the material of the sleeve body 31.

The sleeve body 31 is preferably formed of fabric-coated neoprene, e.g., of the type used to manufacture "wetsuits" and/or "stubby-holders".

A handle 33, or one or more tags (not shown), is attached to the sleeve body 31 assist in "stripping" the sleeve 30 from the recess 60, after the body portion 21 of the blockout 20 has been removed therefrom.

A releasable locating clip 40, preferably manufactured from a length of steel wire bent to shape, has a head portion 41 interconnecting a pair of arms 42, 43, each having respective divergent distal portions 44, 45. The arms 42, 43 are designed to be received in an aligned pair of vertically spaced slots 26 in the neck portion 22 for releasable engagement with the "ridges" of the screw-threaded profile 14 on the upper portion 13 of the elongate shank 11.

As illustrated in FIG. 2, the releasable locating clip 40 enables the blockout body portion 21 (and sleeve 30) to be accurately vertically located on the anchor bolt 10, both before and during the pouring of the cementitious mixture into the mold cavity 51 of the mold box 50; and also until the concrete in the concrete slab S has at least partially-set sufficiently so that the resultant recess 60 is stable in shape. The locating clip 40 can then be released from the neck portion 22 and the screw-threaded portion 14 on the anchor bolt 10 to enable the blockout 20 to be released, as hereinafter described.

Figure 5:
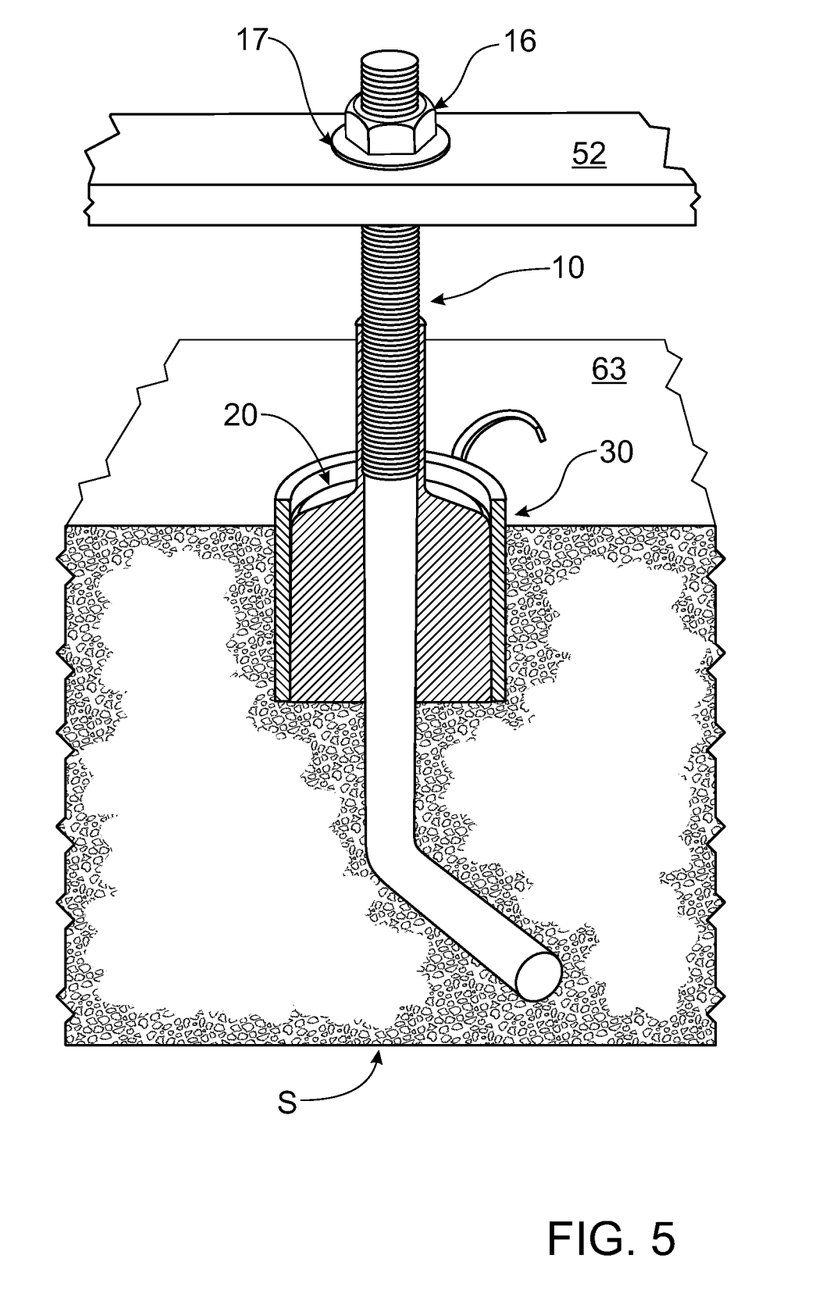
FIG. 5 is a perspective sectional side view of the concrete slab after the cementitious mixture has been poured into the mold box and allowed to at least partially-set.
Figure 6:
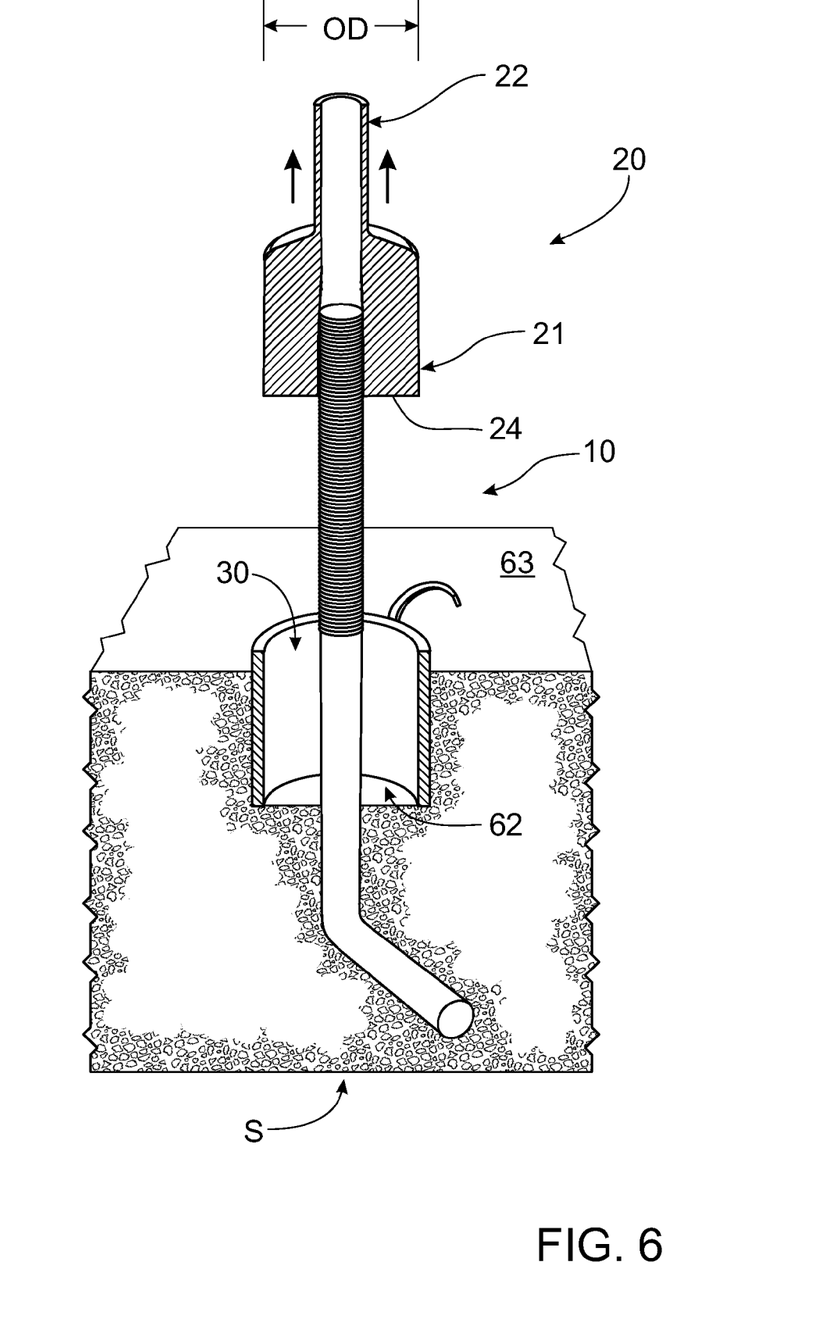
FIG. 6 is a similar view, after the body portion has been withdrawn from the recess formed in the concrete slab about the anchor bolt.

Referring to FIGS. 5 and 6, the mold box 50 is located about the anchor bolt 10, and the upper end of the anchor bolt 10 may be located, and supported by, a board 52 extending diagonally across the mold box 50 above the mold cavity 51. (In this embodiment, the foot 12 of the anchor bolt 10 has not been fixed to other reinforcing steel, but acts act the reinforcing steel, within the concrete slab S is poured.)

Referring particularly to FIG. 5, cementitious mixture, incorporating suitable aggregate (e.g., gravel) and/or reinforcing fibers, is poured into the mold cavity 51 until the top surface 63 of the concrete slab is at the desired height; and the top surface 63 may be finished, e.g., with a trowel, to provide a horizontal support surface for the base plate of the infrastructure/machinery to be secured to the concrete slab S by the anchor bolt 10.

As illustrated in FIG. 6, after the releasable locating clip 40 has been removed, the operator can grip the neck portion 22 and pull the blockout 20 upwardly to release the body portion 21 from the sleeve 30.

Figure 7:
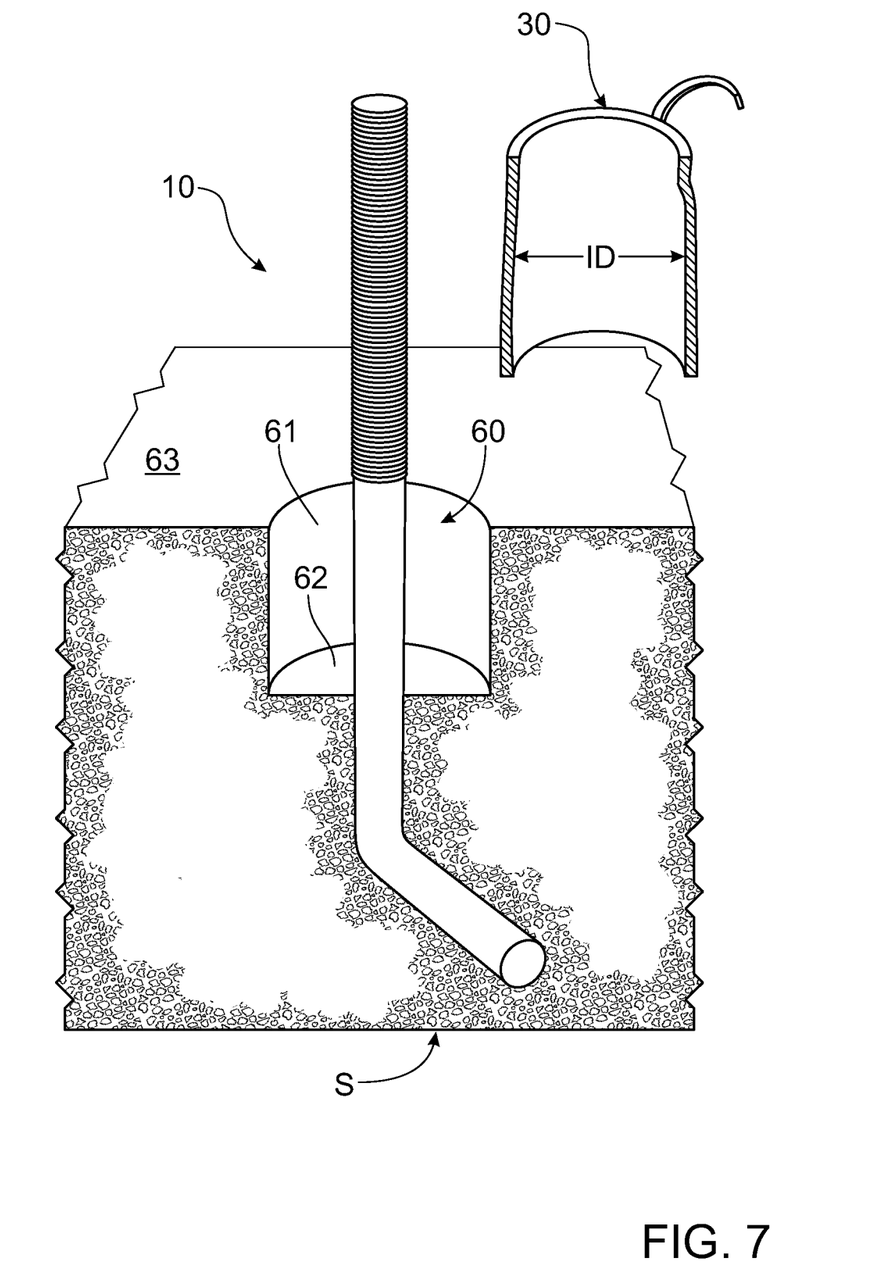
FIG. 7 is a similar view, after the removable sleeve has been stripped from the recess.

As illustrated in FIG. 7, the sleeve 30 can then be released from the recess 60 by pulling upwardly on the handle 33 and/or inwardly flexing/deflecting the sleeve body 31.

Figure 8:
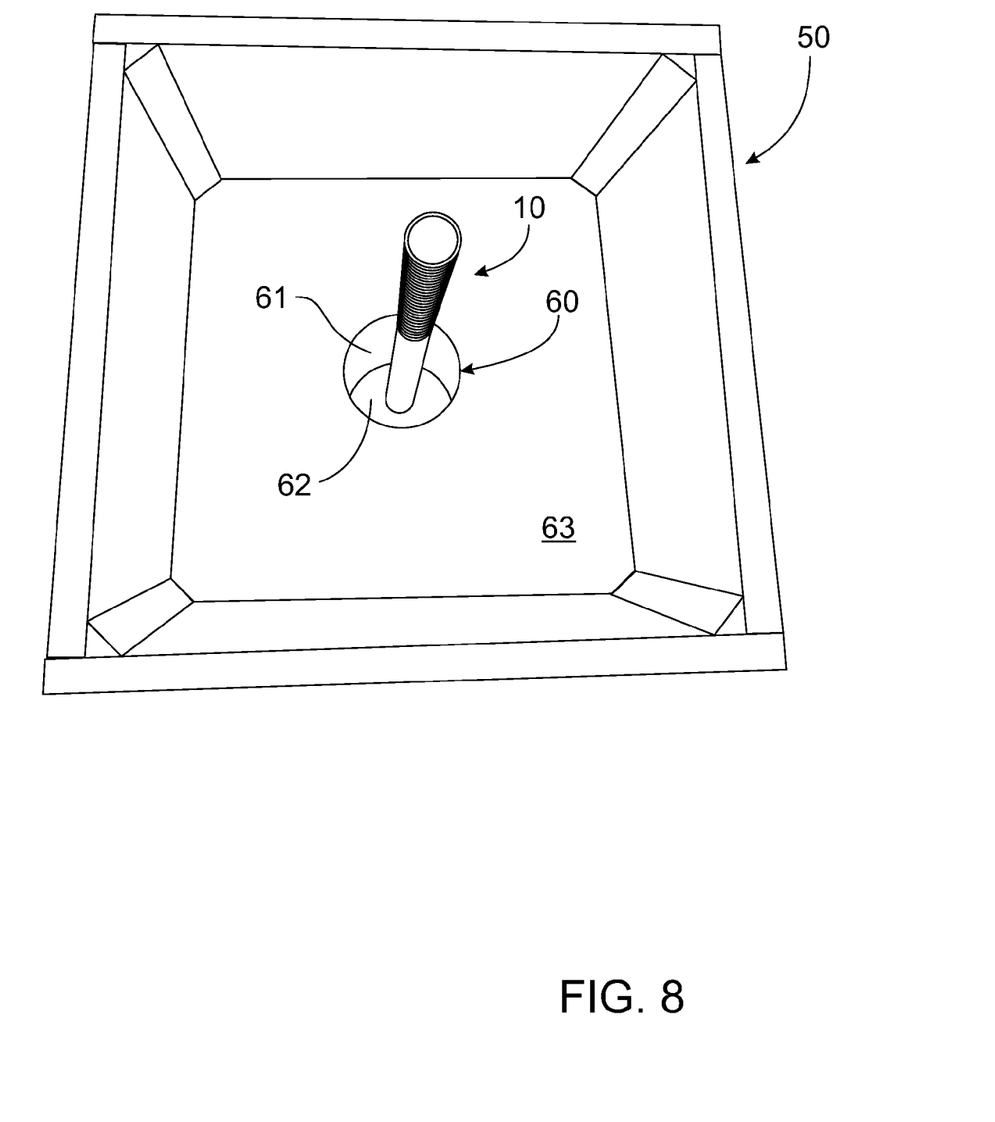
FIG. 8 is a top perspective view of the concrete slab, with the recess surrounding the anchor bolt (before the mold box has been removed)
Figure 9:
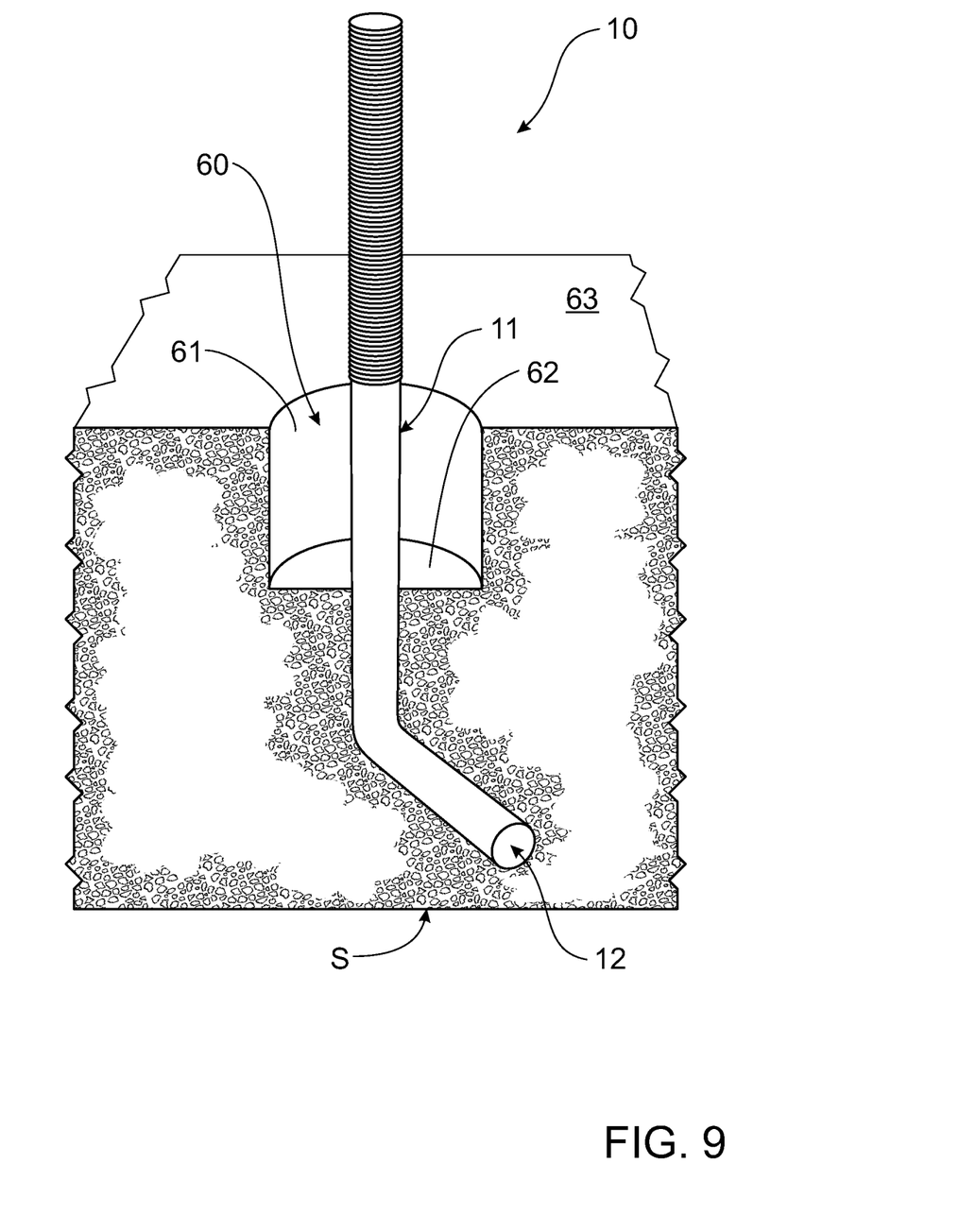
FIG. 9 is a perspective sectional side view of the slab, with the recess surrounding the anchor bolt.

As best illustrated in FIGS. 8 and 9, the resultant recess 60 formed in the top surface 63 of the concrete slab S is coaxial with the elongate shank 11 of the anchor bolt 10, where the screw-threaded portion 14 on the upper portion 13 of the shank 11 extends above the top surface 63 to receive nuts 16 and at least one washer 17 to enable the base plate (not shown) of the infrastructure/machinery to be securely anchored to the concrete slab S once the mold box 50 has been removed.

While an annular (i.e., cylindrical) recess 60 has been described and illustrated, it will be readily apparent to the skilled artisan that, by changing the configuration of the outer wall 25 of the body portion 21, e.g., to square/rectangular/hexagonal/octagonal, the side wall 61 of the recess 60 will be formed with a complementary shape.

After the elongate shank 11 of the anchor bolt 10 has been aligned with its respective hole in the base plate of the infrastructure/machinery, the recess 60 may be filled with a grout or other cementitious material, which is allowed to set after the base plate has been secured to the concrete slab S by the anchor bolt 10 with the nut(s) 16 and washer(s) 17.

If necessary, any cementitious material which has adhered to the bottom wall 24 of the body portion 21 and/or to the body portion 31 of the sleeve 30 may be removed; and the blockout 20 is ready for re-use.

Figure 10:
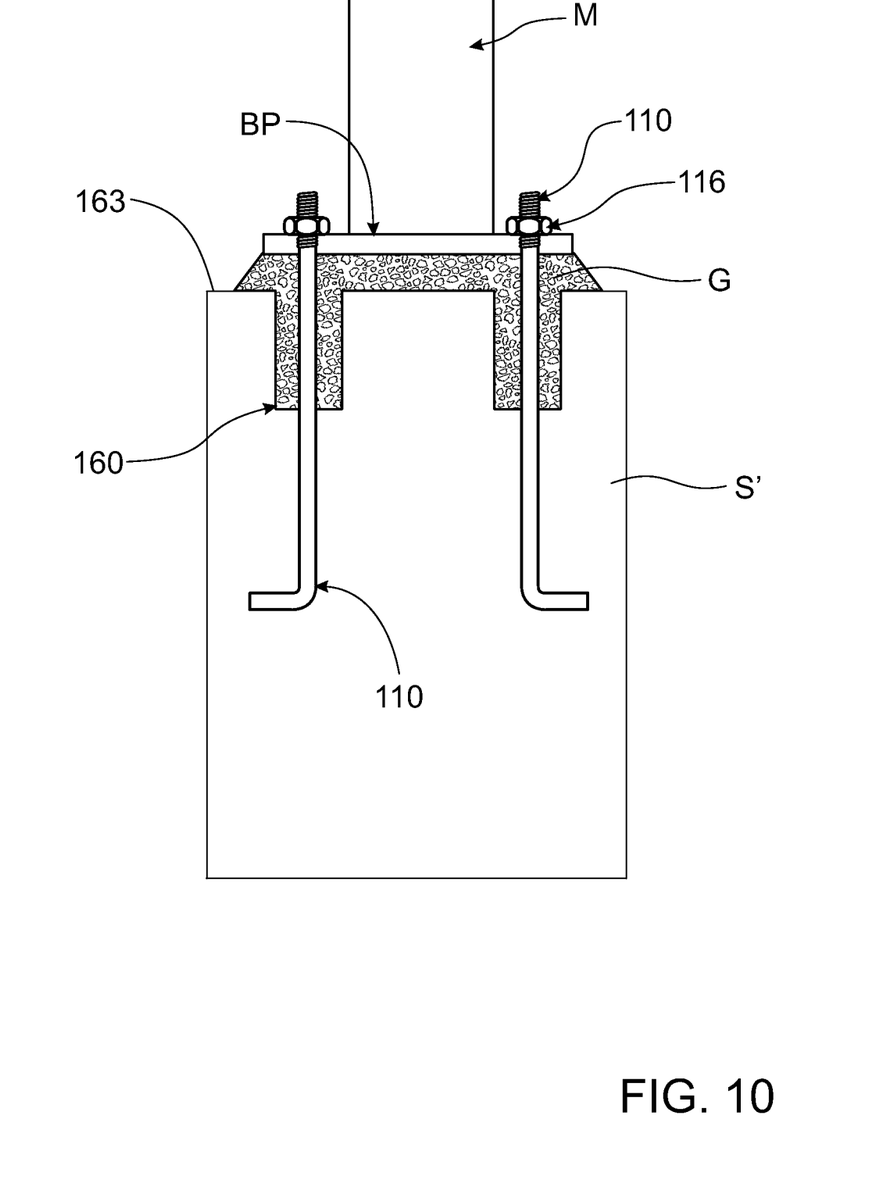
FIG. 10 is a schematic sectional side view of a concrete slab of a second embodiment.

Referring to FIG. 10, the concrete slab S' has a pair of anchor bolts 110 in respective recesses 160 to locate/secure the base plate BP of a portion of infrastructure (i.e., portal beam)/machinery M.

When the base plate BP has been secured to the anchor bolts 110 at the desired level, by locking nuts 116, cementitious grout G is applied to fill the recesses 160 and to fill the cavity C between the base plate BP and the surrounding surface(s) 163 of the concrete slab S.

The skilled artisan will appreciate that the cementitious grout G may be applied, a level support surface for the base plate BP formed, and allowed to set, before the base plate is located on the anchor bolts 110.

The skilled artisan will appreciate that the ability to re-use the blockout 20 means that the materials required to manufacture the blockout 20 are minimized, as are the transport/storage requirements.

Furthermore, in experiments conducted by the inventor, the time required to install and remove a blockout, to form a single recess 60 in a concrete slab S, was reduced from approximately 10-11 minutes for the Prior Art (i.e., expanded polystyrene tube) blockouts to approximately 2 minutes for a blockout 20 made in accordance with the present invention.

Not only was the productivity rate markedly greater with the blockout 20 of the present invention (i.e., 500% improvement); but the worksite did not require removal of any unwanted plastics (e.g., polystyrene) materials, and the blockout 20 was more easily located on, and selectively adjusted relative to, the anchor bolt 10, both before and during the pouring of the cementitious mixture. In addition, the removable locating clip 40 opposed any tendency of the blockout 20 to move upwardly relative to the anchor bolt 10 due to "buoyancy" effects from the cementitious mixture.

The skilled artisan will appreciate the many advantages of the present invention over the prior art blockouts hereinbefore described.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A blockout to form a recess in a concrete slab surrounding an anchor bolt, including:
   a body portion having an external profile conforming to the profile of the recess to be formed;
   a neck-portion extending upwardly from the body portion, when in use;
   an elongate bore through the body portion and the neck portion, the elongate bore having a diameter substantially equal to, or less than, an outer diameter of the anchor bolt; and
   a releasable locating means engageable with the neck portion and with the anchor bolt, when in use, to releasably locate the body portion on the anchor bolt while the recess is being formed, wherein:
   the neck portion is provided with one or more pairs of vertically-spaced aligned slots, open to the elongate bore, arranged to receive the releasable locating means and to allow engagement of the releasable locating means with at least one adjacent portion of the anchor bolt; and at least one portion of the anchor bolt, receivable within the neck portion, has a screw-threaded or non-circular external profile, to be engageable by at least one portion of the releasable locating means, and where the non-circular profiles for the anchor bolt include ribs, flanges, recesses, grooves or the like on the at least one portion of the anchor bolt.

2. The blockout as claimed in claim 1, wherein:

the body portion has a resiliently-deformable outer surface or skin or has a substantially-rigid outer surface and is provided with a removable sleeve, formed of resiliently-deformable material, surrounding the body portion; to assist in the removal of the body portion when the recess has been formed.

3. The blockout as claimed in claim 1, wherein:

the body portion and neck portion are of unitary construction; or are formed separately and then interconnected before use by gluing, R.F. welding, or via a lockable coupling.

4. The blockout as claimed in claim 2, wherein:

the body and neck portions are molded or formed from plastics-material; and the resiliently-deformable outer surface or skin, or the removable sleeve, is formed of fabric-coated neoprene.

5. The blockout as claimed in claim 1, wherein:

the body portion is of solid construction, or is of hollow construction, with optional internal reinforcing ribs and/or rings; and the body portion is circular, square, rectangular, hexagonal, octagonal, or like shape, in top plan view, dependent on the desired shape of the recess to be formed thereby.

6. The blockout as claimed in claim 1, wherein:

the releasable locating means is a clip or retainer having at least one arm or finger releasably engageable with the screw-threaded or non-circular profile on the anchor bolt.

7. A method of forming a recess about an anchor bolt, employing the blockout as claimed in claim 1, including the steps of:

a) placing the body portion on the anchor bolt, with optional frictional engagement between the anchor bolt and the elongate bore;

b) engaging the releasable locating means with the body portion or neck portion to locate the body portion relative to the anchor bolt;

c) filling the mold cavity, surrounding the anchor bolt, and the blockout, with a cementitious mixture to the desired level;

d) allowing the cementitious mixture to at least partially-set;

e) releasing the releasable locating means; and f) withdrawing the body portion from the anchor bolt to leave a recess in the at least partially-set cementitious mixture surrounding the anchor bolt.

8. The method of claim 7, wherein:

when the body portion is provided with the removable sleeve, the method includes the further step of:

g) stripping the removable sleeve from the adjacent sidewall of the recess.

9. The method of claim 8, wherein:

after the removable sleeve has been removed from the recess, the method includes the further step of:

h) filling the recess with grout, or other cementitious material, to the intended level of the infrastructure/machinery to be secured to the slab and/or surrounding top surface(s) of the concrete slab.

10. The blockout as claimed in claim 2, wherein:

the removable sleeve extends above a top face of the body.

11. The blockout as claimed in claim 4, wherein:

the plastics-material incorporates glass- or carbon-reinforcing fibers.

* * * * *